United States Patent [19]
Harmony

[11] 3,917,169
[45] Nov. 4, 1975

[54] EMITTER FOR IRRIGATION SYSTEMS
[75] Inventor: Richard C. Harmony, Tucson, Ariz.
[73] Assignee: Harmony Emitter Company, Inc., Tucson, Ariz.
[22] Filed: Dec. 16, 1974
[21] Appl. No.: 532,869

Related U.S. Application Data
[63] Continuation-in-part of Ser. No. 456,617, April 1, 1974.

[52] U.S. Cl. ............... 239/107; 239/534; 239/542; 239/547
[51] Int. Cl.² ........................................ B05B 01/20
[58] Field of Search ........... 239/107, 108, 269, 450, 239/534, 535, 542, 546, 547

[56]  References Cited
UNITED STATES PATENTS
3,779,468  12/1973  Spencer ..................... 239/107 X
3,797,754  3/1974   Spencer ..................... 239/542
3,804,334  4/1974   Curry ....................... 239/542 X Primary Examiner—John J. Love
Attorney, Agent, or Firm—Cahill, Sutton & Thomas

[57] ABSTRACT
An emitter is disclosed for irrigating soil at a constant rate of water flow despite variations in water pressure.

11 Claims, 7 Drawing Figures

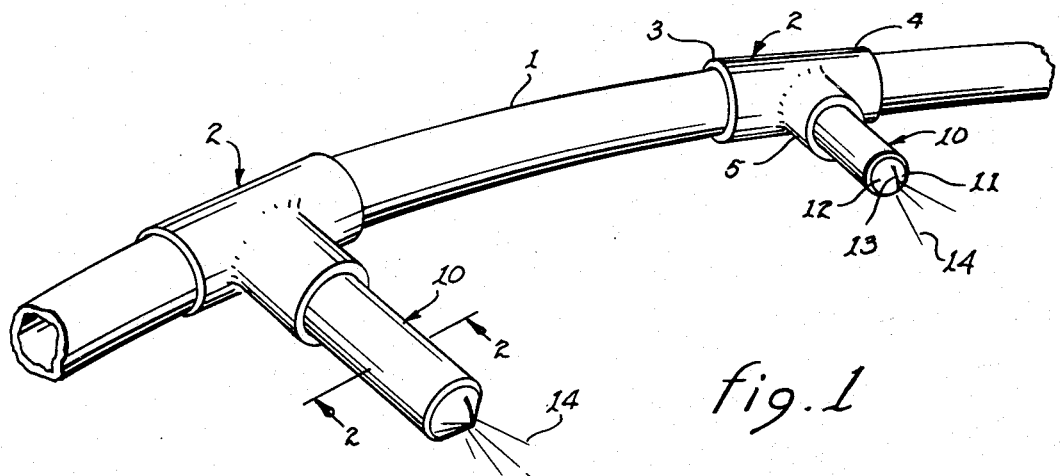
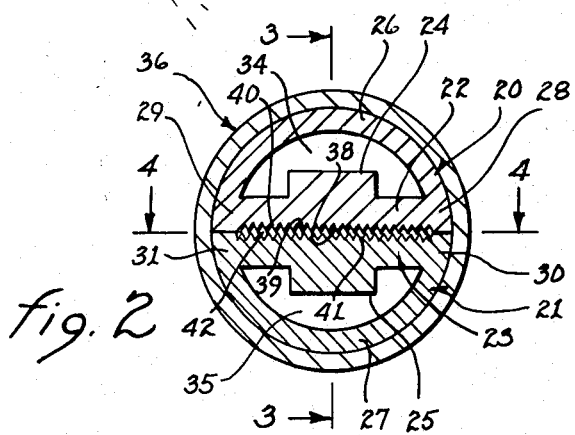
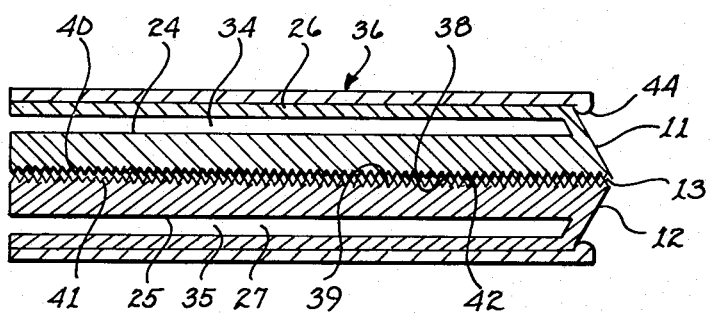
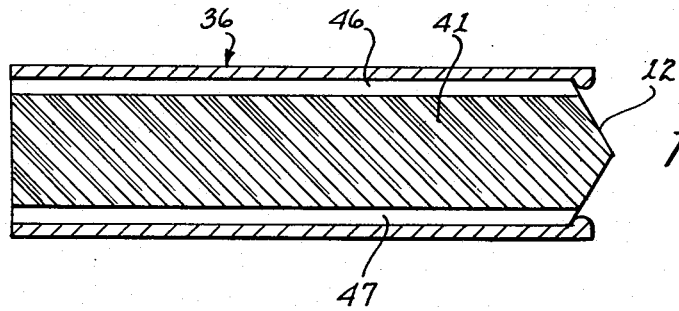

EMITTER FOR IRRIGATION SYSTEMS

The present application is a continuation-in-part of a patent application entitled "EMITTER FOR IRRIGATIONS SYSTEMS", filed on Apr. 1, 1974, and assigned Ser. No. 456,617, which describes an invention by the present applicant.

The present invention relates to water dispersing apparatus and, more particularly, to emitters for irrigating soil.

Irrigation devices of various types have been available for a number of years. These devices may generally be classified into one of two categories: those intended for home use; and, those intended for industrial application.

The devices intended for home use are usually attachable to a water hose and include a multi-port pressure reducing chamber. The water outflow is at a sufficiently low rate so as not to erode the soil from about the plant roots. The rate of water flow is, however, dependent upon the water pressure within the water hose. Therefore, some judgement has to be exercised in regulating the flow of water through the water hose. Where clean water is used, no problems generally develop. However, if the water contains particulate matter of greater than microscopic size, one or more ports within the device generally become clogged and cause a resulting increase in the rate of water flow through the remaining ports. The force of the increased water flow can and often does cause erosion of the surrounding soil.

The devices intended for industrial use are generally connected to a source of irrigation water, that is, water which does contain suspended particulate matter. To overcome the clogging effects of the particulate matter, the outlet ports in these devices are generally of resilient material to permit them to expand as necessary to pass the particulate matter. Where a port expands to pass the particulate matter, the rate of water flow therethrough simultaneously increases. The increased water flow tends to reduce the water pressure within the common envelope feeding the devices and results in a reduction of water flow through the remaining ports. Thereby, uneven irrigation often results. Due to aging, the resilient material may not be able to contract to its initial size and thereby contribute to an uneven rate of water discharge.

Where a plurality of non-self-regulating water discharge devices or ports are disposed along a length of hose, a substantial pressure gradient exists through the length of the hose. The pressure gradient, in turn, tends to cause a proportional water outflow from the devices or ports. Such variation in water flow produces non-uniform irrigation along the length of the hose.

The following patents are representative of the state of the art in soakers and irrigation devices: U.S. Pat. Nos. 2,851,306, 3,698,195, 3,303,800, 3,116,019, 3,685,735, 3,788,544, 3,667,685, 3,080,124, 3,221,996, 3,552,654, 3,767,124, 3,780,946, 3,779,468, 1,366,685, and, 3,777,987.

It is therefore a primary object of the present invention to provide an emitter which delivers a constant flow of water despite variations in the water pressure.

Another object of the present invention is to provide an irrigation system having a plurality of emitters disposed along a water distribution line, which emitters are self regulating to provide a constant water discharge rate from each emitter regardless of the location of the emitter along the line.

Yet another object of the present invention is to provide an emitter for irrigation systems which is useable with irrigation water having particulate matter suspended therein.

A further object of the present invention is to provide an emitter which requires no adjustments to control the rate of water flow therethrough despite variations in water pressure.

A yet further object of the present invention is to provide a self regulating emitter for irrigation systems.

A still yet further object of the present invention is to provide a self flushing and non-clogging emitter for irrigation systems.

A still further object of the present invention is to provide an inexpensive, easily manufacturable emitter.

These and other objects of the present invention will become apparent to those skilled in the art as the description thereof proceeds.

The present invention may be described with greater specificity and clarity with reference to the following drawings, in which:

FIG. 1 illustrates an emitter embodying the principle of the present invention, which emitter is attached to a water distribution pipe of an irrigation system.

FIG. 2 illustrates a cross-section of the emitter shown in FIG. 1 and taken along lines 2—2.

FIG. 3 illustrates a cross-section of the emitter shown in FIG. 1 and taken along lines 3—3.

FIG. 4 depicts a cross-section of the emitter shown in FIG. 2 taken along lines 4—4.

Figure 6:
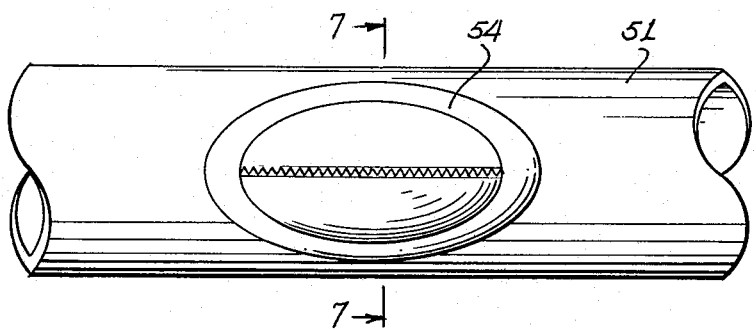
FIG. 6 illustrates a top view of the present invention.
Figure 5:
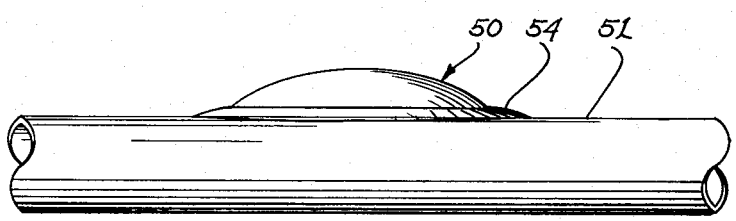
FIG. 5 illustrates an elevational view of the present invention.

An irrigation system incorporating the principles of the present invention is shown in FIG. 1. A water distribution pipe 1, representing a source of water under pressure, includes a plurality of T-fittings 2 having arms 3 and 4 engaging sections of the pipe. The third arm 5 of T-fitting 2 may be directly connected to emitter 10. Alternatively, a length of hose may be inserted intermediate arm 5 and emitter 10.

Emitter 10 is formed as a cylindrical device having one end adapted to mate with arm 5. The other end of the emitter 10 includes a pair of lips 11 and 12 defining a mouth 13 therebetween. The water flows through an internal passageway within emitter 10 and emerges from mouth 13, as depicted by numeral 14. The rate of water flow therefrom is constant despite variations in water pressure and is controlled by the constuctural features of emitter 10.

Referring jointly to FIGS. 2, 3 and 4, the component parts of emitter 10 will be described in detail. Emitter 10 includes a pair of half round sections 20 and 21 maintained in juxtaposed relationship by a cylindrical envelope 36. Half round section 20 is formed by an imperforate flexible sheet 22, extending across a half round canopy 26. A longitudinal ridge 24 is attached to or formed as an integral part of flexible sheet 22. The ridge tends to restrain flexing of the flexible sheet along its longitudinal axis. Half round section 21 is similarly formed by an imperforate flexible sheet 23, an attached or integral ridge 25 and a half round canopy 27.

Each half round section 20 and 21 may be formed as an integral unit. Alternatively, each of the half round canopies may be formed separately of the respective flexible sheet. In such case, the half round canopies may be placed upon or joined to lateral edges of the respective flexible sheet, that is, edges 28 and 29 of sheet 22 or edges 30 and 31 of sheet 23.

A plurality of ribs 40, which ribs are angularly oriented on a 45° bias to the longitudinal axis of emitter 10, are disposed within sheet 22 at the central part of surface 38. Similarly oriented ribs 41 are disposed within sheet 23 at the central part of surface 39. When emitter 10 is assembled as shown in FIG. 2, ribs 40 intersect the opposing ribs 41 at an angle of 90° and form interstices therebetween. The lateral parts of surface 38 in proximity to edges 28 and 29 are flat to sealingly mate with similar flattened lateral parts of surface 39 in proximity to edges 30 and 31. The interstices between surfaces 38 and 39 extending through the length of emitter 10 define a passageway 42 through the emitter.

The half round canopies and the flexible sheet of each of half round section, 20 and 21, define chambers 34 and 35, respectively. One end of each of these chambers are closed by lip 11 or 12. The other end of each chamber is in fluid communication with arm 5 and the water pressure therein such that the pressure within each chamber is essentially equivalent to the water pressure within pipe 1 (see FIG. 1). Thereby, the water pressure within pipe 1, via the chambers, will provide a bias acting upon the respective flexible sheet.

The two half round sections 20 and 21 are maintained in position with respect to one another by means of cylindrical envelope 36. A bead 44 extends radially inwardly from envelope 36 and contacts the radial surface of lips 11 and 12 to prevent half round sections 20 and 21 from being forced therepast.

In operation, emitter 10 is connected, either directly or by means of a hose, to arm 5, whereby water will flow through arm 5 into passageway 42 defined by surfaces 38 and 39 and will discharge through mouth 13. Because of the orthogonally oriented ribs 40 and 41, the water flow through the passageway will be random and turbulent. The randomness and turbulence of the water flow will establish a water pressure gradient from the input end of emitter 10 to mouth 13 within the passageway. Simultaneously, water will also flow into each of chambers 34 and 35. The water pressure extant within chambers 34 and 35 will tend to bias flexible sheets 22 and 23 toward one another to prevent lateral expansion of the passageway 42. Because of the interstices between ribs 40 and 41, passageway 42 will never be completely closed to water flow despite substantial increases in pressure within chamber 34 and 35.

Should the water pressure within pipe 1 (see FIG. 1) vary at different locations of emitters 10, the emitters accommodate such variation while providing an essentially constant rate of water discharge from each emitter. As stated above, the interstices determine the water flow which will always occur regardless of the amount of water pressure within pipe 1. Normally, an increase in water pressure within passageway 42 would tend to laterally displace surfaces 38 and 39 from one another and thereby expand the passageway. Such an expanded passageway would, of course, increase the water flow rate therethrough. The expansion, however, is inhibited by the simultaneous increase in water pressure within chambers 34 and 35. This increase in water pressure will tend to maintain surfaces 38 and 39 adjacent one another. Due to the pressure gradient extant within passageway 42, the water pressure within the passageway in proximity to mouth 13 is substantially less than the water pressure within chambers 34 and 35. The pressure differential may possibly slightly compress the ribs 40 and 41 to reduce the size of the interstices. Whereby, the cross-section of passageway 42 is reduced in response to the increased means level of the pressure gradient resulting in a constant rate of water flow through mouth 13. Thus, a predetermined regulated water flow will always be present at each emitter 10, regardless of the water pressure within the attached section of pipe 1.

If the water within pipe 1 is contaminated by suspended particulate matter, it may be quite likely that such particulate matter would be forced into passageway 42. Should the particulate matter be too large to freely flow through the interstices, it may become lodged intermediate surfaces 38 and 39. In order for the particulate matter to become lodged, it will have to exert a lateral force upon each of the surfaces 38 and 39. Such a lateral force will tend to displace the surfaces from one another. The increased displacement of the surfaces will increase the flow of water in proximity thereto and tend to force the particulate matter through the passageway.

By experimentation, it has been learned that the turbulent water flow within passageway 42 will wash out most particulate matter. Thereby, emitter 10 is self cleansing. Through further experimentation, it has been found that with an emitter having a half inch wide passageway, particulate matter of up to one eighth of an inch in diameter can be passed by the emitter. Thereby, emitter 10 is also non-clogging.

It may be noted that emitter 10 can be assembled from three easily manufactured parts, the two half round sections 20, 21 and envelope 36. Thereby, the emitter is substantially more simple than any equivalent prior art device and can be produced at a fraction of their cost.

Referring now to FIGS. 5–8, a further embodiment of an emitter 50 constructed in accordance with the principles of the present invention will be described. The illustrated bubble-like emitter 50 is mounted at intervals along a water line 51. The water line may be flexible or rigid and formed of metallic, plastic, or other materials, the selection of which has no appreciable effect upon the emitter and is determined by other criteria.

The emitter 50 is formed as a smoothly curved bubble having an oval or elliptically shaped base 52. An aperture 53, essentially commensurate with that of base 52, is formed within water line 51. Base 52 is bonded or cemented to the external surface of water line 51 about aperture 53, as shown. In the alternative, base 52 may be bonded or cemented directly to the edge or side wall surface of aperture 53. A reinforcing band 54 extends about emitter 50 in juxtaposition with the junction intermediate base 52 and aperture 53. Band 54 serves primarily as a reinforcing member and may be omitted in instances where a sufficiently strong bond can be effected between base 52 and aperture 53 to withstand normal use of the present invention.

The bubble-like portion of emitter 50 is formed of curvilinear diaphragm-like elements 55, 56 of flexible material in contact with one another along the longitudinal axis of the emitter, each defining approximately one half of the bubble. The skirt 57 depends downwardly from edge 58 of element 55 into water line 51. A flange 59 depends downwardly and laterally from the lower edge of skirt 57. A similar skirt 60 depends downwardly from edge 61 of element 56 into water line 51. A flange 62 depends downwardly and laterally from the lower edge of skirt 60. As edges 58 and 61 are adjacent one another during quiescent conditions, surfaces 63 and 64 of skirts 57 and 60, respectively, are also adjacent one another and flanges 59 and 62 extend laterally away from one another. Surfaces 63 and 64 are striated such that a plurality of contact points exist therebetween. The striated surfaces may be formed in the manner of ribs 40 and 41 as discussed above with reference to FIGS. 3 and 4.

The operation of the present invention illustrated in FIGS. 5–8 may be described as follows. As water flows through water line 51, the pressure exerted thereby will cause a flow of water intermediate surfaces 63 and 64 of each emitter 50. The striations within opposing surfaces 63 and 64 will produce a pressure gradient which extends from flanges 59 and 62 to edges 58 and 61. The spacing intermediate these surfaces, and hence the rate of water discharge therethrough, is regulated by the ambient water pressure within water line 51 acting upon surfaces 65 and 66 of skirts 57 and 60, respectively. Hence, the lateral expansion of skirts 57 and 60 induced by the water pressure gradient intermediate surfaces 63 and 64 is effectively countered by the water pressure acting upon surfaces 65 and 66 to prevent separation of the skirts in proximity to edges 58 and 61. Therefore, the rate of water discharge from emitter 50 is essentially a function of the striations upon surfaces 63 and 64 and is essentially independent of the water pressure within water line 51.

Flanges 59 and 62 have been incorporated to prevent the folding over of skirts 57 and 60 upon one another during normal handling and storage of water line 51. Should such folding over occur, water flow through emitter 50 might be impeded.

Most presently known emitters are highly sensitive to particulate matter suspended within the to be discharged water. Should such particulate matter become lodged within the mouth of the prior art emitters, the rate of water discharge is generally drastically altered or, the prior art emitter is damaged. The embodiment of the present invention illustrated in FIGS. 5–8 accommodates the existence of suspended particulate matter in the following manner.

Figure 8:
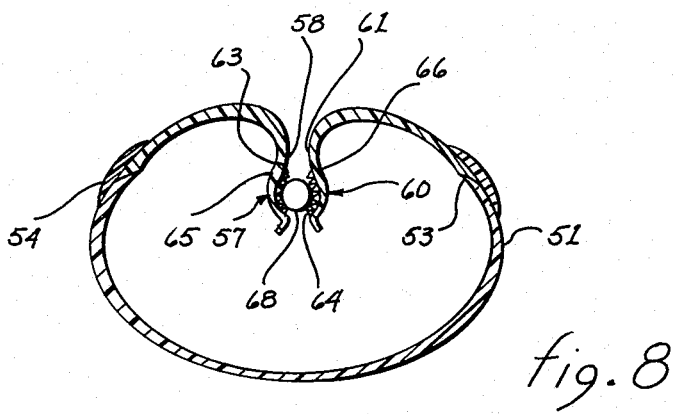
FIG. 8 is a cross-sectional view of the present invention illustrating the change in configuration to accommodate passage of particulate matter.
Figure 7:
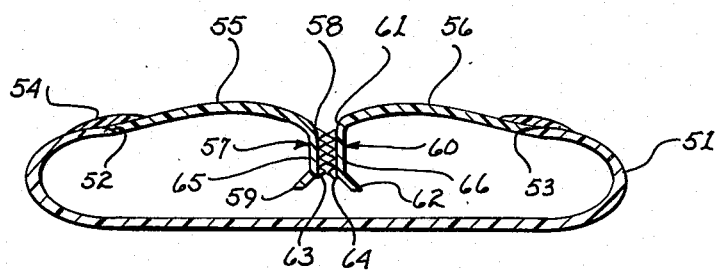
FIG. 7 illustrates a cross-sectional view of the present invention taken along lines 7—7, as shown in FIG. 6.

Referring particularly to FIG. 8, there is shown a water line 51 connected to a source of water under pressure. It will be assumed that a piece of particulate matter 68 which was conveyed by the water within the water line has entered the space intermediate the striated surfaces of skirts 57 and 60. The particulate matter, presumptively too large to pass through the striations within surfaces 63 and 64, will tend to displace laterally skirts 57 and 60. The lateral displacement of the skirts will increase the size of the discharge orifice defined by edges 58 and 61. The increased orifice size will tend to modify the pressure gradient intermediate skirts 57 and 60 and permit a greater flow of water therethrough, as depicted by the arrows. The increased flow of water will tend to exert a purging effect upon the particulate matter 68 to wash it out.

As mentioned above, the striations within surfaces 63 and 64, in a normal mode, will tend to produce a pressure drop intermediate skirts 57 and 60. The pressure drop renders the pressure acting upon surfaces 65 and 66 greater than the countering pressure intermediate the skirts. Therefore, surfaces 63 and 64 will remain essentially adjacent one another. However, when particulate matter displaces skirts 57 and 60 apart from one another, the pressure differential between the pressure acting upon surfaces 65 and 66 and the countering pressure intermediate skirts 57 and 60 becomes much less. Hence, the force tending to urge skirts 57 and 60 toward one another becomes substantially reduced. And, skirts 57 and 60 will exert only a minimal lateral force upon particulate matter 68 so that the particulate matter is essentially unimpeded during its passage intermediate skirts 57 and 60.

It is to be understood that elements 55 and 56 must be formed of relatively resilient and flexible material so as to accommodate momentary deformation induced by discharging particulate matter.

From the above description, it may be appreciated that any particulate matter flowing intermediate skirts 57 and 60 will be expelled therefrom with the aid of the water pressure within water line 51. The further and additional characteristics and benefits discussed above with respect to the invention illustrated in FIGS. 1–4 are also pertinent to the embodiment of the present invention illustrated in FIGS. 5–8.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. In an irrigation system having an apertured water pipe for conveying a flow of water from a source of water under pressure to each aperture, an emitter disposed at each aperture for discharging water from the water pipe to the area to be irrigated, said emitter comprising in combination:
   a. a water passageway for discharging water from an aperture in the water pipe to the soil to be irrigated;
   b. a pair of elements for supporting said water passageway within the aperture of the water pipe, one of said pair of elements extending across one part of the aperture and another of said pair of elements extending across another part of the aperture, said one and said other of said pair of elements including an edge, which edges, in combination, define the discharge orifice of said water passageway;
   c. bias means for constricting said water passageway in response to variations in water pressure within the water pipe; and
   d. means for establishing a pressure gradient within said water passageway as a function of the water pressure within the water pipe; whereby, the rate of water discharge through said emitter is maintained at a constant rate despite variations in water pressure within the water pipe.

2. The emitter as set forth in claim 1 wherein said water passageway comprises a pair of skirts coterminous with one another, each one of said pair of skirts depending from one of said edges toward the interior of the water pipe and including a first surface forming a wall of the passageway and a second surface in contacting relationship with the water flowing through the water pipe.

3. The emitter as set forth in claim 2 wherein said means for establishing a pressure gradient comprises striations disposed upon each of said first surfaces.

4. The emitter as set forth in claim 3 wherein said striations comprises a first set of ribs disposed upon one of said first surfaces and a second set of ribs disposed upon the other of said first surfaces, said first and second set of ribs being in non-alignment with one another to establish a plurality of point contacts between said one first surface and said other first surface.

5. The emitter as set forth in claim 4 including a laterally directed flange disposed along the inwardmost edge of each of said skirts.

6. The emitter as set forth in claim 5 wherein said skirts and said flanges are formed of flexible material to accommodate passage through said water passageway of particulate matter suspended in the water.

7. The emitter as set forth in claim 6 wherein said elements are formed of flexible material to accommodate passage through the discharge orifice of particulate matter suspended in the water.

8. The emitter as set forth in claim 7 wherein each of said pair of elements include a curvilinear surface extending lateral to the water pipe, said curvilinear surfaces, in combination, defining a bubble extending lateral to the water pipe.

9. The emitter as set forth in claim 8 wherein said edges bisect said bubble.

10. The emitter as set forth in claim 1 wherein said water passageway is formed of flexible material to accommodate passage through said water passageway of particulate matter suspended in the water.

11. The emitter as set forth in claim 10 wherein said elements are formed of flexible material to accommodate passage through the discharge orifice of particulate matter suspended in the water.

* * * * *